(No Model.)
C. E. BURNS.
Machine for Manufacturing Cylindrical Blocks.
No. 237,242. Patented Feb. 1, 1881.
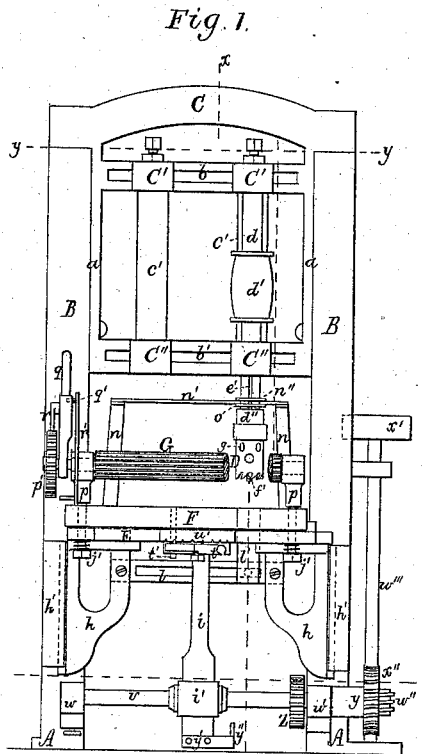
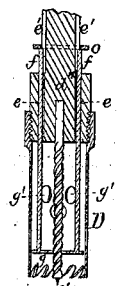
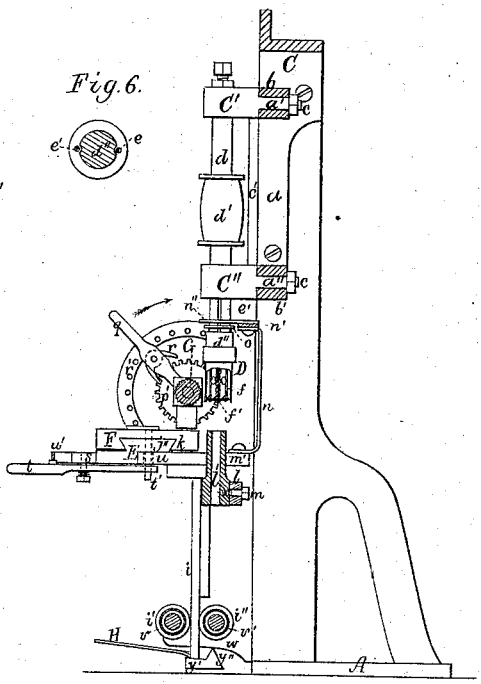
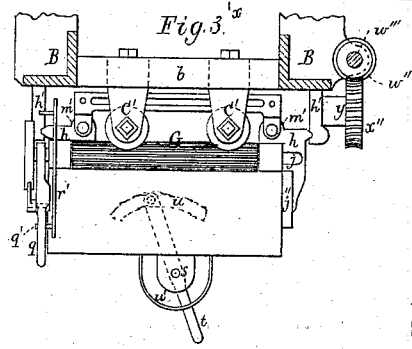
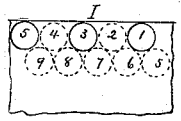
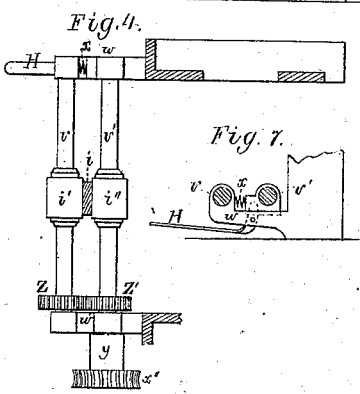
Witnesses.
S. N. Piper
Wm C Lunt
Inventor.
Charles Edward Burns.
by R. H. Eddy atty

UNITED STATES PATENT OFFICE.

CHARLES E. BURNS, OF LANCASTER, ASSIGNOR OF ONE-HALF TO HENRY C. LIBBY, OF BETHLEHEM, NEW HAMPSHIRE.

MACHINE FOR MANUFACTURING CYLINDRICAL BLOCKS.

SPECIFICATION forming part of Letters Patent No. 237,242, dated February 1, 1881.

Application filed August 30, 1880. (No model.)

*To all whom it may concern:*

Be it known that I, CHARLES EDWARD BURNS, of Lancaster, of the county of Coos and State of New Hampshire, have invented a new and useful Improvement in Machinery for Manufacturing Cylindrical Blocks for being converted into spools or various other articles; and I do hereby declare the same to be described in the following specification and represented in the accompanying drawings, of which—

Figure 1 is a front elevation of my machine. Fig. 2 is a vertical section through line $x\,x$, Fig. 1. Fig. 3 is a horizontal section through line $y\,y$, same figure. Fig. 4 represents the friction-rollers for elevating the feeding-table. Fig. 5 is a vertical section of the cylindrical saws. Fig. 6 is a horizontal section of the cutter-head. Fig. 7 is a cross-section of the friction-roller shafts, showing the method of operating them to control the movement of the feeding-table; and Fig. 8 is a segment of a butt from which the blocks are cut.

Similar letters of reference indicate corresponding parts.

The nature of the invention consists as follows: First, in a combination consisting of cylindrical saws and central bits thereof, a vertically movable table, and a plate to slide horizontally, all being substantially as and for the purpose hereinafter specified; second, in the combination of a cylindrical saw fixed to a shaft or spindle and provided with clearances and central boring-bits with suitable feeding mechanism, all being substantially as described; third, in the combination of an elevating and depressing table, and its traverse-plate operated by a lever with a feed-roller and cylindrical saws, all being substantially as described; fourth, in the combination of disks within circular saws provided with vertical rods projecting through the saw head or stock with a tappet, an elevating and depressing table and cylinders for knocking the blocks out of the saws when the butts are cut through and the table is depressed, all being substantially as described; fifth, in the combination of a cylinder supporting the projecting part of the butt on the table with the elevating and depressing table, cylindrical saws, and center boring-bits, all being substantially as described; sixth, in a shaft, journaled at one end in a movable bearing, operated by a treadle and springs so as to place a friction-roller in and out of gear with another shaft, in combination with the latter shaft, furnished with a tappet and also with another shaft having a friction-roller, and also with an elevating and depressing table, all being substantially as set forth; seventh, in the arrangement of the saws at distances apart equal to the diameters of their bores, all being as and for the purpose hereinafter set forth.

In my machine I have cylindrical saws operated by suitable mechanism, that carry central boring-bits operating simultaneously with the saws, whereby the block is cut out and perforated at the same time.

I also have in my machine disks attached to rods running up through the saw stock or head, which, by the action of the table hereinafter mentioned, knocks the blocks off the saws after they are cut out.

I also have in my machine a feed-table, on which the wood is placed and held by one or more feed-rollers. Said table carries cylinders immediately under the saws, the centers coinciding with the bits which bear against the under side of the wood, furnishing a support for it where it projects beyond the table, and at the same time allow the bits to enter the wood without obstruction. The table also carries a traverse-bed operated by a lever for adjusting the wood to obtain the greatest number of blocks, and thus economize the same, and also the oscillating feed-roller, worked by a ratchet and lever on a graduated arc to give the distance for sawing out blocks of different diameters, so that it will work with precision and not waste the wood.

I also have in the machine devices for operating the knocking-off mechanism, and that for controlling the movement of the table and the feeding of the wood, hereinafter specifically referred to and described.

Referring to the drawings, A represents the base-plate of the machine, B B are the housings, and C is the cap or arch, all securely bolted together. The extension $a/a$ of the cap-peice is bolted securely to the housings B B, and in this extension, forming part thereof, are the horizontal slotted guides $b\ b'$, one above the other in the same plane. In the slot of $b$ is placed the projecting shank or stud $a'$ of the vertical journal $C'$, and in $b'$ is placed the similar part, $a''$, of the vertical journal $C''$, and they are secured by bolts $c$, screwed into the end of the studs from the rear, the heads abutting on washers which bear against the guide. The vertical journals $C'\ C''$ are joined by a shank, $c'$, giving them strength and enabling them to be set so that the two journals will coincide without difficulty or inconvenience. A pair of these vertical bearings is provided for each saw that the machine runs.

In the vertical journals is placed a spindle or shaft, $d$, so as to revolve freely on its axis, and to this shaft, between the guides $b\ b'$, is fixed the pulley $d'$, to be driven by a belt from a suitable motor.

On the lower end of the shaft $d$ is a head or stock, $d''$, screw-threaded at its lower end, which engages the threads on the inner surface of the cylindrical saw D at the upper part thereof, and through this head or stock are made vertical holes $e\ e$, which coincide with and are extended into the grooves $e'\ e'$ in the shaft $d$, on opposite sides thereof, as clearly shown in Figs. 5 and 6. In the holes are placed the rods $f\!f$, which extend down into the interior of the saw and are fixed at their lower ends to the perforated disk $g$ within the saw. The disk is free of the saw and moves up and down with the rods $f\!f$, which guide and limit and control its movement.

In the axis of the head $d''$ is a threaded hole or socket, in which is secured a bit, $f'$, coinciding with the axis of the saw and extending down just below the saw-teeth.

The saw D is the ordinary cylindrical saw operated by shaft $d$, but at a point about midway between the head $d''$ and the teeth is a circle of perforations, $g'$, serving as clearances for the dust cut out by the bit $f'$ when the machine is in operation.

The feeding-table is represented by the letter E. This table is supported by the brackets $h\ h$, secured to the under side of the table at each end and on the rear edge thereof, and these brackets are secured between the vertical guides $h'\ h'$ projecting from the housings B B, so that it has free vertical movement in the guides. At the middle of the table, from the under side, flush with the rear edge, extends downward a flat shaft, $i$, the lower end of which is between the two friction-rollers $i'\ i''$. The table is provided with slots $j$, at each end for guide screws or studs $j'\ j'$, and on its upper surface is the dovetailed longitudinal projection $j''$, which engages the dovetailed slot $k$ in the under side of the traverse-bed F, which is thus firmly joined to the table, but is capable of a free lateral movement, limited in extent by the screws $j'\ j'$, passed up through slots $j$ into the bed F.

To the rear of the brackets $h\ h$ is secured, just below the level of the table, a slotted rest, $l$. A cylinder, $l'$, is secured to this rest in an upright position by a screw, $m$, passed through the slot in the rest $l$ and entered into the cylinder $l'$ near its lower end. This cylinder is secured in a vertical plane, so that its axis coincides with the plane of the axis of the saw D, and when the table is elevated the cylinder is carried up to the saw, entering the same while the bit enters into the bore of the cylinder.

On the rear edge of the table are two projections, $m'\ m'$, to which are fastened the lower ends of the uprights $n\ n$, which are joined at the top by the horizontal slotted plate $n'$. In the slot in this plate is secured at one end, by a screw, the tapper $n''$, which, at the other end, is provided with a hole, through which is passed the shaft or spindle $d$. The slotted plate $n'$ is placed at such an elevation above the table that when the latter is depressed as far as it will go the tapper will bear upon a washer, $o$, that rests upon the upper ends of the rods $f\!f$, and when it is raised will not strike the journal $C''$—in other words, as the table is elevated and depressed the tapper moves freely up and down on the shaft, and when moved downward strikes the washer, and thus forces the rods $f\!f$ down, which act upon the disk, and this, in turn, bearing upon the block, knocks the block downward and free of the saw, as will be hereinafter more fully described.

From the top of the traverse-bed F, at each end, near the rear edge, rise studs $p\ p$, in which is pivoted the longitudinally-serrated feed-roller G. The pivot at one end, extended beyond the stud, carries a fixed ratchet-wheel, $p'$. Between the ratchet-wheel and stud is fulcrumed, on the pivot, a lever, $q'$, to which is pivoted the double pawl $r$, engaging the ratchet $p'$. A segment, $r'$, is fixed to the traverse-bed F, in juxtaposition to the lever $q$. This segment is graduated by perforations, which engage the stud $q'$, projecting from the lever, or by other suitable device, so that the movement of the lever can be exactly indicated, and it can be secured in the position to which it is moved.

When the pawl engages the ratchet the lever, of course, rotates the serrated feed-roller G, and it must be adjusted so as to move the said roller the exact distance necessary to feed the wood to the saws, and when this distance is reached the lever-catch is permitted to engage the proper hole in the graduated segment, thus holding the feed-roller firmly in place, and this, in turn, holds the wood to the table and in position to be operated upon by the saws.

From the front edge of the table E projects a stud, $s$, to which is fulcrumed a lever, $t$, the working end thereof pivoted to a stud, $t'$, passed up through a slot, $u$, in the table E, and is fixed in the under side of the traverse-bed T. By means of this lever the bed F is moved laterally both ways for the purpose of feeding the wood to the saws, as will be hereinafter referred to. The handle of the lever moves upon a semicircular guard, $u'$, fixed to the table and concentric with the pivot or fulcrum of the lever. This guard is provided with graduated notches, that engage a catch on the lever, so that the distance to move it is plainly indicated, and when the proper point is reached it can be secured against displacement.

The friction-rollers $i'\ i''$ are fixed, respectively, to the shafts $v\ v'$, both of which are journaled in the arms $w\ w'$, projecting from the housings B B just above the base of the machine. The bearing in the arm $w$, in which shaft $v'$ is journaled, is movable on the arm, it being connected therewith by a feather on its under side, entered into a slot. Between the block containing this bearing and the bearing of shaft $v$ is interposed the spiral spring $x$.

Underneath the arm $w$ is fulcrumed a treadle, H, the end of which projects upward into a slot in the movable bearing. By means of this treadle and the spring $x$ the bearing of this end of the shaft is given a slight back-and-forth movement, sufficient to engage and disengage the friction-roller $i''$ from the shaft $i$. The friction-rollers $i'\ i''$, acting upon the shaft $i$, elevate the feed-table E. As, however, the upward movement should be controlled automatically, an arm, $y'$, is fixed to the lower end of the shaft $i$, below the rollers and parallel to the shafts. On the end of this arm, at right angles therewith, is fixed a tappet, $y''$, having an inclined face, which is immediately under shaft $v'$. Now, when by the action of the friction-rollers the table is elevated and it arrives at the point—that is, when the wood is sawed through—the adjustment of the tappet $y''$ is such that it strikes the shaft $v'$ with its inclined face, and the shaft rotating against it is pushed back, disengaging the friction-roller $i''$ from the shaft $i$, thus stopping its movement and depriving the table of its support at the same time. This causes the table to fall, and the mechanism hereinbefore described knocks the blocks from the saws. The shafts $v\ v'$ are geared together by toothed wheels $z\ z'$, fixed to them, respectively. Motion is communicated to them by a worm-wheel, $w''$, on vertical shaft $w'''$, (this shaft being operated by a belt from the shafting-pulley running over pulley $x'$,) meshing with the gear-wheel $x''$, fixed to a projection, $y$, of the shaft $v'$.

In the practical machine a gang of saws is employed, the number in the gang depending upon the size of the machine employed, and they are so hung in the machine that they are at distances apart equal to the diameter of the bore of each of the said saws. The object of this arrangement will be referred to hereinafter.

The operation of my invention is as follows: The wood from which the blocks are to be sawed is prepared by first sawing sections from the log of a thickness equal to the intended length of the blocks. These sections are called "butts," and are the same as the stock from which shoe-pegs are made. A part of one of these butts is shown in Fig. 8. From the periphery of the butt is sawed a thin slab, so as to obtain a straight edge, as indicated by letter I in Fig. 8. The machine being set in operation, one of the butts is placed on the traverse-bed F with its straight edge I under the serrated feed-roller G, and in a perpendicular line with the near side of the saws, which should press the block closely and tightly between itself and the table, and for this purpose, and to accommodate it to receive blocks of different thicknesses, it should be made vertically adjustable in its bearings. When the butt is in this position the lever $q$ should be thrown back in the direction of the arrow as far as it will go and the double pawl made to engage the ratchet-wheel. The lever is now drawn forward, rotating the roller G, and by means of it advancing the butt until the latter is moved under the saw a distance equal to the exact diameter of each of the proposed blocks. The catch in the lever is then allowed to enter the perforation on the graduated segment $r'$, with which it is in juxtaposition, and it is thus held securely in place. When in this position the part of the butt projecting beyond the table bears upon the cylinders $l''$ as the tops thereof are in the same plane as the top of the traverse-bed F. The foot is now applied to the treadle H, bringing the friction-roller $i''$ in contact with the shaft $i$, causing the table to rise and the saws to operate upon the butt at 1 3 5, as indicated by the solid circular lines in Fig. 8. The number of saws in the gang entering the butt depends upon the extent of the surface of the butt exposed to the saws; but all the saw-cuts 1 3 5, &c., are separated at intervals 2 4, &c., each of which is precisely equal in length to the diameter of one of the saw-bores, as indicated by the dotted circles in the same figure. The saws cut out cylinders, which enter the saws and bear against the under side of the disks $g$, and the bits $f'$ simultaneously bore the hole through the cylindrical blocks. The upward movement of the table, of course, feeds the butt to the saws, and the cylinder $l'$ being less in diameter than the inner cylinder of the saw, it enters the saw and the bit enters the cylinder $l'$, so that the butt is completely cut through before the table is stopped without the saw coming in contact with metal. The disks $g$, vertical rods $f$, and washers $o$ are likewise pushed up by the blocks. When the butt is cut through the adjustment is such that the tappet on the end of shaft $i$ comes in contact with the shaft $v'$ and throws it back, disengaging the roller $i''$ from the shaft $i$, as before explained, and thus the upward movement of the table is stopped, and there being no support for it it falls back, carrying the butt from the saws, and simultaneously the tappets $n''$, striking upon the washers $o$ drive the rods downward, and the disks $g$, bearing upon the blocks within the saws, knock them out, and thus clear the saws for another cut. The table being depressed, the lever $t$ is released from its guard, and through it the traverse-bed F is moved to the right for a distance exactly equal to the diameter of the saw, minus the thickness of the saw—that is, the distance between its inner and outer peripheries. This brings the uncut intervals 2 4, &c., under the saws, and the catch in the lever being released, so as to engage the slot immediately adjacent to it, it is thus securely held in place. The foot is then again applied to the treadle and the table elevated, as before, and this time the saws cut out the intervals indicated by the dotted lines, and when the butt is cut through the operation is the same, as before described. The table being depressed again, the lever $q$ is again operated to move the butt forward the necessary distance for a new line of cuts, as indicated by the dotted circles 5 6 7 8 9 in Fig. 8, and the traverse-bed is moved to the left the necessary distance when the table is elevated, and the operation proceeds as before, the circles with the uneven numbers being cut out at the first elevation of the table, and those with the even numbers at the second.

The machine can operate very rapidly, a skillful workman being able to quickly perform all the operations of feeding the butts and regulating the movement of the table.

The cutting and boring being done simultaneously is of itself a great improvement upon the method practiced before the date of my invention, such method consisting in cutting the blocks from lumber first sawed into square stock and seasoned, which is an expensive operation, and next turning and boring the blocks, thereby wasting much of the stock and much labor.

The economy in the consumption of the stock obtained by this machine is very marked. The method of manipulating the butt by sawing out the blocks, so that intervals of the same diameter will remain which are cut out at the second elevation of the table, permits the saving of the saw-scarf in this operation, as the saws will cut into the scarf of the first cut and merely round off the corners, so that only this part will be wasted.

I contemplate moving the table automatically, and also having in the rods $ff$ short pins going through them, such pins being to keep loose the bit-dust inside of the saw, in order that such dust may be properly discharged therefrom, so I sometimes operate the bar $i$ by a grooved cam to receive a stud or friction-roller projecting from the bar.

Having thus described my said machine, what I claim therein as of my invention may be stated as follows, viz:

1. The combination, in a machine for the manufacture of spool-blanks, of the cylindrical saws having central bits, the vertically-movable table, and the horizontal sliding plate F, as and for the purpose specified.

2. As an improvement in machinery for manufacturing cylindrical blocks for turning purposes, the cylindrical saw D, fixed to shaft or spindle $d$, and provided with the clearances $g'$ and central boring-bits, $f'$, in combination with suitable feeding mechanism, substantially as described.

3. As an improvement in machinery for manufacturing cylindrical blocks for turning purposes, the elevating and depressing table E, with traverse-plate F, operated by lever $t$, in combination with feed-roller G and cylindrical saws D, substantially as described.

4. As an improvement in machinery for manufacturing cylindrical blocks for turning purposes, the disks $g$ within the circular saws, provided with vertical rods $f$, projecting through the saw head or stock, in combination with the tappet $n''$, elevating and depressing table E, and cylinders $l'$, for knocking the blocks out of the saws when the butts are cut through and the table is depressed, substantially as described.

5. As an improvement in machinery for manufacturing cylindrical blocks for turning purposes, the cylinder $l'$, supporting the projecting part of the butt on the table, in combination with elevating and depressing table, cylindrical saws, and center boring-bits, substantially as described.

6. As an improvement in machinery for manufacturing cylindrical blocks for turning purposes, the shaft $v'$, one end journaled in a movable bearing operated by treadle and spring so as to place the friction-roller $i''$ in and out of gear with shaft $i$, in combination with the shaft $i$, provided with the tappet $y''$, shaft $v$, having friction-roller $i'$, and elevating and depressing table E, substantially as described.

CHARLES EDWARD BURNS.

Witnesses:
CHESTER B. JORDAN,
OSSIAN RAY.